United States Patent
McLennan

(10) Patent No.: US 9,591,041 B1
(45) Date of Patent: *Mar. 7, 2017

(54) METHOD AND SYSTEM FOR STABILIZING AND STREAMING FIRST PERSON PERSPECTIVE VIDEO

(71) Applicant: Action Streamer, LLC, Cincinnati, OH (US)

(72) Inventor: Christopher S. McLennan, Cincinnati, OH (US)

(73) Assignee: Action Streamer, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,165

(22) Filed: Oct. 27, 2016

Related U.S. Application Data

(63) Continuation of application No. 15/074,271, filed on Mar. 18, 2016.

(60) Provisional application No. 62/177,607, filed on Mar. 19, 2015.

(51) Int. Cl.
   *G06F 15/16* (2006.01)
   *H04L 29/06* (2006.01)
   *H04B 1/3827* (2015.01)
   *H04N 5/232* (2006.01)

(52) U.S. Cl.
   CPC ......... *H04L 65/4069* (2013.01); *H04B 1/385* (2013.01); *H04L 65/607* (2013.01); *H04N 5/23267* (2013.01)

(58) Field of Classification Search
   CPC ......... A42B 3/00; A42B 3/042; A42B 3/0433; A42B 3/30; A42B 3/306; A42B 1/245; G10K 11/18
   USPC .......................................... 709/230; 348/157
   See application file for complete search history.

(56) References Cited

U.S. PATENT DOCUMENTS

| | | | | |
|---|---|---|---|---|
| 7,403,474 | B2 * | 7/2008 | Rorie ................ | H04L 12/4641 370/219 |
| 2003/0198182 | A1 * | 10/2003 | Pegrum ............. | H04L 12/4625 370/225 |
| 2006/0015770 | A1 * | 1/2006 | Dicorpo ............ | G06F 11/2053 714/5.1 |
| 2006/0053527 | A1 * | 3/2006 | Schneider .......... | A42B 1/205 2/171.1 |
| 2007/0052804 | A1 * | 3/2007 | Money .............. | H04N 5/76 348/143 |
| 2007/0255819 | A1 * | 11/2007 | Hua ................. | H04L 45/00 709/224 |
| 2008/0030590 | A1 * | 2/2008 | Ciudad ............. | H04N 7/147 348/211.12 |

(Continued)

FOREIGN PATENT DOCUMENTS

WO    WO 2015030984 A1 *  3/2015 ............ H04W 36/30

*Primary Examiner* — Kostas Katsikis
(74) *Attorney, Agent, or Firm* — Frost Brown Todd LLC

(57) ABSTRACT

It is possible to capture video information using one or more body mounted cameras, to transmit that information over a wireless communication channel, and to process that information, such as by using angular momentum information captured by gyroscopes, to obtain an image which is suitable for viewing in real time. This technology can be applied in a variety of contexts, such as sporting events, and can also be applied to information which is captured and stored for later use, either in addition to, or as an alternative to, streaming that information for real time viewing.

20 Claims, 5 Drawing Sheets

(56) References Cited

U.S. PATENT DOCUMENTS

| | | | |
|---|---|---|---|
| 2008/0030621 A1* | 2/2008 | Ciudad | H04N 7/147 348/586 |
| 2008/0048931 A1* | 2/2008 | Ben-Ari | A42B 3/0433 345/8 |
| 2009/0034411 A1* | 2/2009 | Bernard | H04L 41/06 370/221 |
| 2009/0189981 A1* | 7/2009 | Siann | H04N 7/183 348/143 |
| 2012/0304767 A1* | 12/2012 | Howard | A42B 3/046 73/504.03 |
| 2012/0307882 A1* | 12/2012 | Ballocca | H04N 7/025 375/240.01 |
| 2013/0002525 A1* | 1/2013 | Foote | A42B 3/0433 345/8 |
| 2013/0106976 A1* | 5/2013 | Chu | H04L 65/1069 348/14.02 |
| 2013/0215281 A1* | 8/2013 | Hobby | G06F 3/005 348/207.1 |
| 2014/0121792 A1* | 5/2014 | Jennings | A63B 71/10 700/91 |
| 2014/0146812 A1* | 5/2014 | Qiu | H04L 65/1016 370/352 |
| 2014/0325258 A1* | 10/2014 | Mendiratta | G06F 11/2002 714/4.11 |
| 2015/0063313 A1* | 3/2015 | Kanamarlapudi | H04W 36/30 370/332 |
| 2015/0320601 A1* | 11/2015 | Gregg | A61F 9/06 345/8 |
| 2015/0338659 A1* | 11/2015 | Gallery | A42B 3/042 345/8 |
| 2016/0015109 A1* | 1/2016 | Anwar | H04N 7/181 348/78 |
| 2016/0044276 A1* | 2/2016 | Shearman | A42B 3/0426 348/207.1 |
| 2016/0099025 A1* | 4/2016 | Anwar | G11B 27/036 386/244 |
| 2016/0182850 A1* | 6/2016 | Thompson | H04N 9/8205 348/158 |

* cited by examiner

METHOD AND SYSTEM FOR STABILIZING AND STREAMING FIRST PERSON PERSPECTIVE VIDEO

CROSS REFERENCE TO RELATED APPLICATIONS

This is a continuation of, and claims the benefit of, U.S. non-provisional patent application Ser. No. 15/074,271, filed on Mar. 18, 2016, which itself is a non-provisional of, and claims the benefit of, provisional patent application 62/177,607, filed on Mar. 19, 2015. Each of those applications is hereby incorporated by reference in its entirety.

FIELD

The technology disclosed herein can be applied to the transmission and processing of streaming data. In certain preferred embodiments of the disclosed technology, this streaming is video captured by helmet mounted cameras at a sporting event and processed through the application of customized stabilization algorithms in real time by one or more remote devices.

BACKGROUND

When streaming data, the objective of providing high fidelity real time information must often be balanced against the need to work within technical limitations of the devices and infrastructure used in that streaming. For example, the bandwidth of the channel over which data is being streamed imposes a limit on the amount of information that the streaming data can include. Similarly, the speed with which a device is able to process data imposes a limit on the amount of data that can be streamed through that device. These limitations can become even more acute when multiple data streams have to be handled simultaneously, and when operating in a context which is subject to communication errors or other types of failures. In some contexts, these limitations can be so severe that certain types of applications, such as real time streaming of multiple video feeds over a wireless communication network, simply have not been feasible. Accordingly, there has been a need in the art for improved technology to accommodate streaming data, particularly in contexts where streaming data from multiple sources is transmitted over a failure prone communication channel and requires some level of processing for delivery.

SUMMARY

Disclosed herein is technology which can be implemented in a variety of manners, including systems and methods for allowing a plurality of video streams transmitted wirelessly from a plurality of sources to be processed and made available for viewing within limitations associated with the wireless transmission or subsequent processing of video. Other ways of implementing the disclosed technology are also possible, and so the material set forth in this summary should be understood as being illustrative only, and should not be treated as limiting.

BRIEF DESCRIPTION OF THE DRAWINGS

The drawings and detailed description which follow are intended to be merely illustrative and are not intended to limit the scope of the invention as set forth in the appended claims.

DETAILED DESCRIPTION

Disclosed herein is novel technology which can be used for a variety of purposes, including capturing, transmitting and processing video information obtained using cameras mounted on the bodies of athletes participating in a sporting event. It should be understood that, while the present disclosure focuses on embodiments in which the disclosed technology is used for transmitting and smoothing video captured using cameras mounted in football helmets, the disclosed technology can be used in other contexts as well, such as in other sports (e.g., hockey, lacrosse, skiing, baseball, etc) or in non-sporting contexts (e.g., to smooth video captured by a dashcam for a car or a wearable camera).

Figure 1:
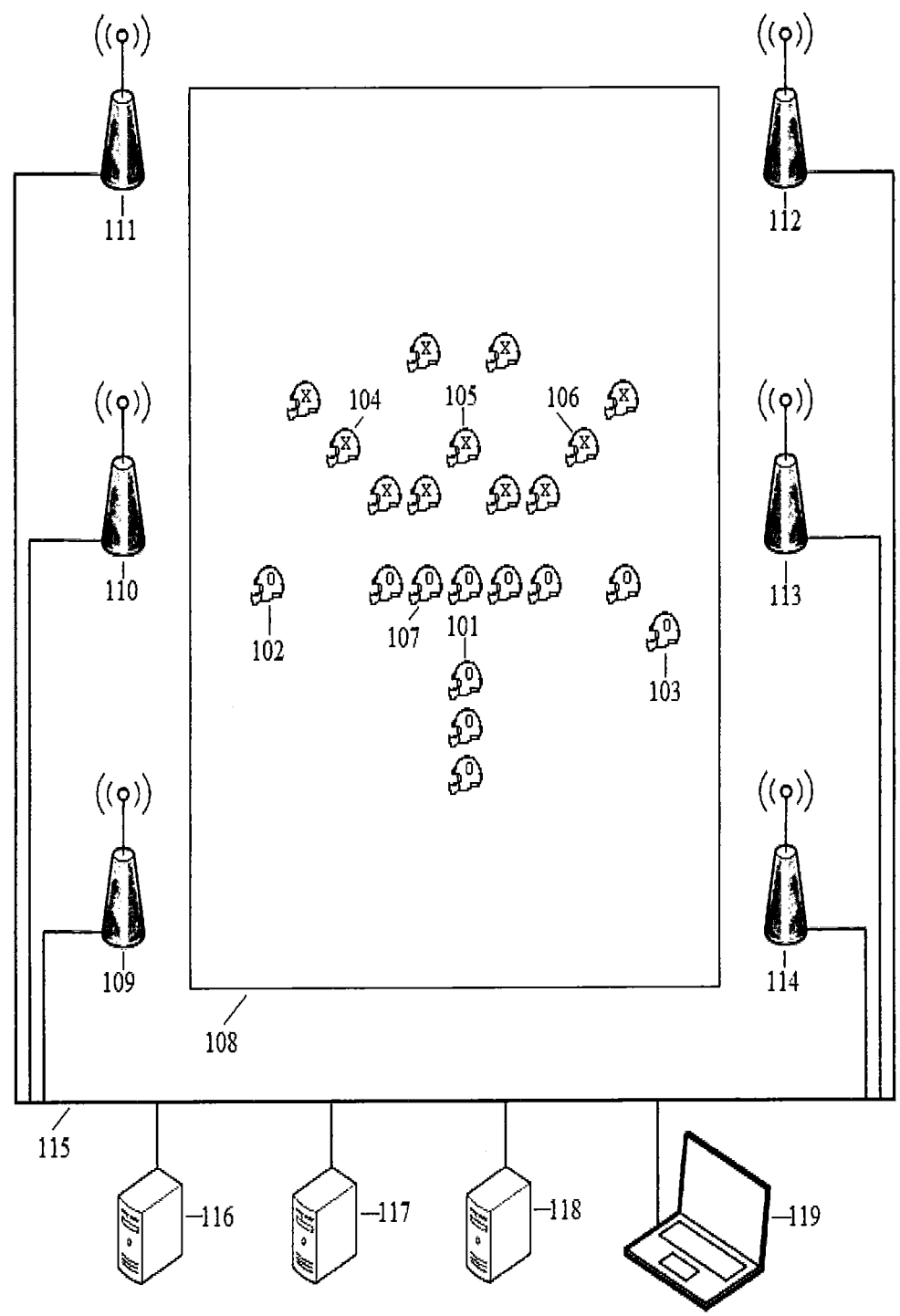
FIG. 1 depicts an environment in which aspects of the disclosed technology could be deployed.

Turning now to the figures, FIG. 1 provides a high level illustration of an exemplary environment in which a preferred embodiment of the disclosed technology could be deployed. In that figure, a number of players with instrumented helmets [101-107] are engaged in a football game on a football field [108]. Several views of an exemplary embodiment of such an instrumented helmet are provided in FIG. 2, in which a camera [201] is affixed to a standard football helmet and connected to a control module [202] at the rear of the helmet via a wire [203]. The control module [202] would preferably include a gyroscope, processor, battery, memory, and wireless transceiver. In general, there are no specific requirements for these components, though their form factors and capabilities would likely reflect the contexts in which they are used. For example, in an instrumented helmet used to stream video, they would preferably be small and light to avoid impacting the player due to weight or bulk, and would need to have sufficient processing capability (preferably 700 MHz ARM processor or other commercially available processor with equivalent or better capabilities) to run any kind of client side software used in the video streaming (e.g., software for encoding the video data in a compressed transmission format to reduce required bandwidth, software for correlating angular velocity data with streaming data, etc).

In operation, the control module [202] would preferably enhance video data captured by the camera [201] with contemporaneous angular velocity data captured by the gyroscope (e.g., by adding time stamps to the angular velocity data which could be used to correlate specific angular velocity measurements with frames in the video). This enhanced video data would then be stored in the memory (overwriting older data with newer data as necessary if the memory becomes full) and transmitted (e.g., in the form of a raw video stream and associated time-stamped angular velocity data) to one or more remote devices in accordance with instructions received by the transceiver and stored in the memory.

The environment illustrated in FIG. 1 also includes a plurality of access points [109-114]. In practice, these access points [109-114] will preferably use a wireless communication channel to receive enhanced video data from the instrumented helmets [101-107] and to send instructions to those helmets regarding when and how that enhanced video data should be transmitted and/or stored. The access points [109-114] will also preferably generate log files indicating any problems with these communications, such as dropped packets or interference on a particular channel.

In addition to communicating wirelessly with the instrumented helmets [101-107], the access points will preferably also communicate over a wired network [115] with a plurality of communication servers [116-118]. In operation, the communication servers [116-118] will preferably convert the enhanced video data from the instrumented helmets [101-107] into video streams suitable for display to a user, such as by decompressing the enhanced video data and outputting it on a specified HDMI port. The communication servers [116-118] could also perform various amounts of additional processing on the enhanced video data, such by, once the raw video and gyroscopic information from the enhanced video data are available, applying smoothing functions to the raw video using the enhanced video data's gyroscopic information (e.g., using an algorithm such as described by Karpenko, Jacobs, Baek and Levoy in *Digital Video Stabilization and Rolling Shutter Correction Using Gyroscopes*, STANFORD TECH REPORT CTSR 2011-03, available at https://graphics.stanford.edu/papers/stabilization/karpenko_gyro.pdf the disclosure of which is incorporated by reference herein). The communication servers [116-118] could also apply smoothing software which doesn't rely on gyroscopic information, such as (e.g., ffmpeg vid-stab or one of a variety of commercially available feature recognition based products such as those offered by Microsoft (e.g., using Microsoft's hyperlapse technology) and Apple (e.g., using the stabilization feature embedded in iMovie, iPhone, and similar Apple products)). This could be done by specifying parameters for characteristics like shakiness and accuracy, and will preferably aggressively center video images on a target without scaling them. Command lines with exemplary parameters which could be used for this purpose with the ffmpeg vid-stab software are set forth in table 1:

TABLE 1

| command lines which could be used with ffmpeg vid-stab software |
|---|
| 1 ./ffmpeg -i test.MOV -vf vidstabdetect=shakiness=10:accuracy=15:result="test.trf" -strict -2 |
| 2 ./ffmpeg -i test.MOV -vf vidstabtransform=smoothing=30:zoom=5:input="test.trf" -strict -2 output.mov |

In addition to, or as an alternative to, smoothing and/or decompression features such as described above, in some embodiments communication servers [116-118] could also provide error detection and/or correction functionality. To illustrate, consider a context in which a few seconds of delay between the events captured by the cameras on the instrumented helmets [101-107] and the display of those events to a user is acceptable. In this context, each of the communication servers [116-118] may maintain a 2-3 second buffer to store data for the video stream(s) it is processing. Then, in the event that a communication server doesn't receive one or more frames for a video stream it is processing, it could send a message to the instrumented helmet which originally provided that stream instructing that helmet, if those frames are still available in its memory, to resend them so the communication server could insert them into the appropriate buffered video stream. Of course, similar error detection and correction functions could also take place in contexts where real time display of events (e.g., no perceptible latency between an event's occurrence and its display, which in general would correspond to a buffer of between 150-200 milliseconds) is necessary, though, as would be understood by one of ordinary skill in the art, the effectiveness of such error detection and correction functions will be greater when more time is available for them to be performed.

In the environment depicted in FIG. 1, in addition to being used for communications between the access points [109-114] and the communication servers [116-118], the wired network [115] would also preferably be used for communications between a command and control computer [119] and the other devices on the network [115]. In operation, the command and control computer [119] would preferably be used to generate commands which would cause the other devices depicted in FIG. 1 to operate in a manner which is consistent with the goals of the particular application for which the disclosed technology is being deployed. For example, when the disclosed technology is deployed to handle video streams generated during a football game, if the left guard is involved in an important play, then the command and control computer [119] could send a command to that player's instrumented helmet [107] instructing it to send its video of that play at a higher frame rate and bit depth than that instrumented helmet [107] normally used.

The command and control computer [119] will also preferably be configured to identify and/or predict problems and to take action to remediate them. To illustrate, consider the case where the instrumented helmets [101-107] are configured to send their data to particular ports on particular communication servers [116-118], and the communication servers [116-118] are configured to listen for the data from their helmets on the specified ports. In this type of implementation, changing the parameters with which data is sent from the left guard's instrumented helmet [107] could increase the processing requirements for that data to the extent that the communication server to which that data was allocated (e.g., a first communication server [116]) could not satisfy those requirements while continuing to process the other streams which were allocated to it. To prevent this from unnecessarily degrading system performance, prior to instructing the left guard's instrumented helmet [107] to send data with parameters that would increase processing requirements (e.g., sending it at an increased frame rate and bit depth), the command and control computer [119] could calculate the increase in processing requirements which would be caused by the change, and compare the post-change processing requirements with the processing capacity of the first communication server [116]. Then, if the comparison revealed a problem, when the command and control computer [119] sends the command which would change the processing requirements, it could also reshuffle the allocation of enhanced video streams to avoid any of the communication servers being overwhelmed. For example, the command and control computer [119] could send a command to the left tackle's instrumented helmet [107] which would cause that helmet to send its video data to a second communication server [117], send a command to the first communication server [116] to stop listening for the data from the left guard's instrumented helmet [107], and send a command to the second communication server [117] instructing it to listen for the data from the left guard's instrumented helmet [107] on the port designated by the command and control computer [119].

Figure 3:
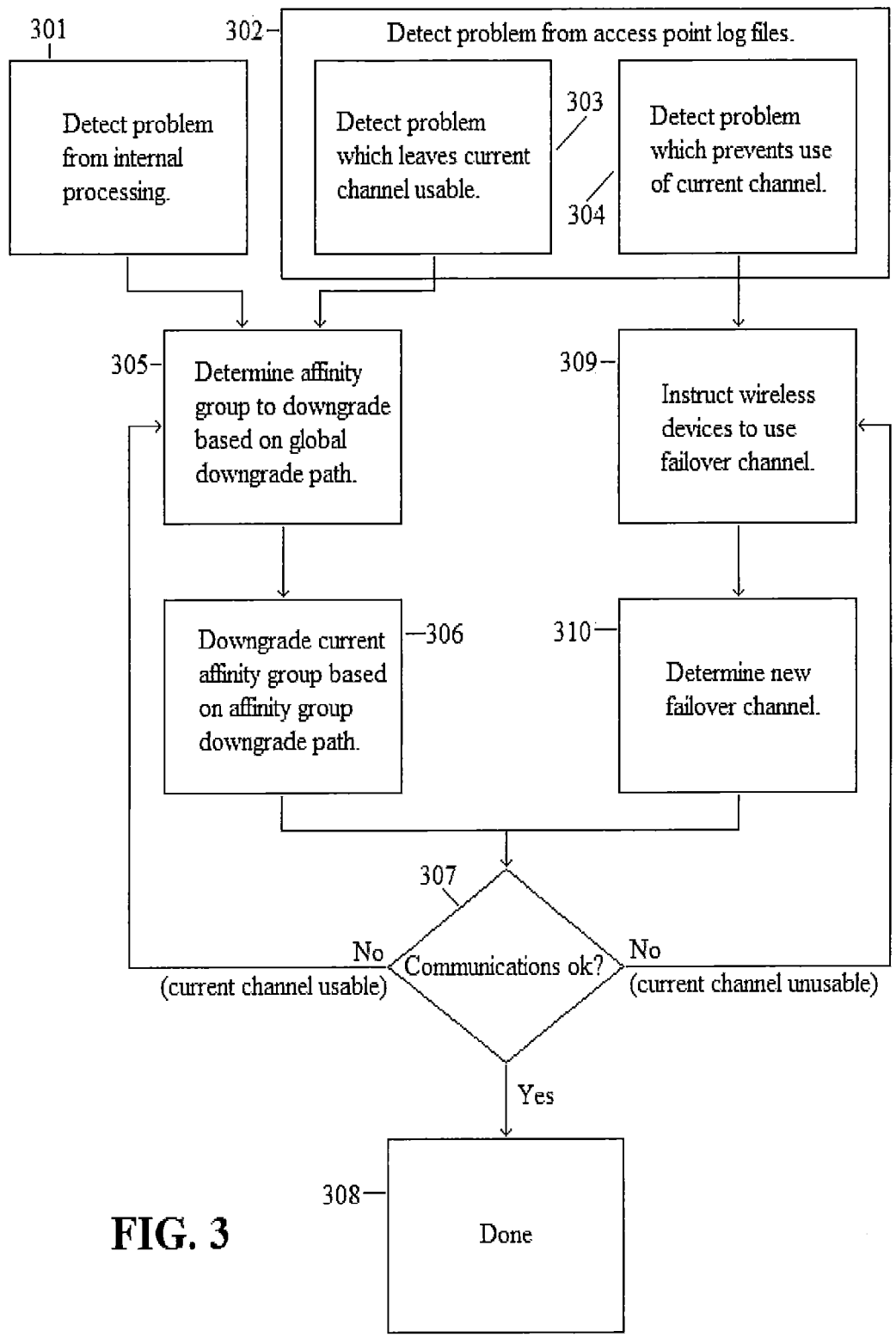
FIG. 3 depicts steps which could be used to account for problems in wireless communication of streaming data.

Of course, it should be understood that the above discussion of how a command and control computer [119] could perform problem detection and remediation functions is intended to be illustrative only, and should not be treated as limiting. To illustrate, consider FIG. 3, which depicts steps a command and control computer [119] could use to account for problems in wireless communication between instrumented helmets [101-107] and access points [109-114] rather than problems caused by limitations in processing capacity of communication servers [116-118]. In FIG. 3, initially a problem in the wireless communications will be detected [301][302]. Such problem detection could take place in a variety of manners, and, as shown in FIG. 3, multiple approaches to problem detection could be used in a single embodiment. For example, a command and control computer [119] could detect problems using its own internal processing [301], such as by, before sending a command which will increase the bandwidth required for transmitting data from one or more of the instrumented helmets, comparing the total bandwidth which would be required by all the instrumented helmets after the change and a collective bandwidth limit for communications between the instrumented helmets [101-107] and the access points [109-114]. Such a command and control computer [119] could also periodically poll the access points [109-114] and use log files generated by those access points to detect a problem with the wireless communications [302] even in the absence of bandwidth needs exceeding a collective bandwidth limit.

Just as a command and control computer [119] could use different techniques to detect problems, it could detect different types of problems using those techniques. To illustrate, consider that a command and control computer [119] could be programmed to identify both problems which are consistent with communications being able to continue on the current communication channel and problems which render the current communication channel unusable. For instance, the command and control computer's internal processing indicating an incipient bandwidth over-allocation could be treated as a problem which is consistent with communications on the current channel being able to continue. Similarly, if a review of access point log files indicates an increase in dropped packets, that finding could be treated as detecting a problem (e.g., intermittent minor interference) which interferes with the current communication channel while still leaving it usable [303]. By contrast, if there is more serious interference, such as if the wireless communications are taking place in the 5 GHz band (particularly the 5470-5725 MHz range, which has traditionally been handled using dynamic frequency selection logic requiring a significant downtime after interference is detected) and the access point log files indicate a pulse consistent with utilization of the current channel by a radar system, this can be treated as detection of a problem which renders the current channel unusable [304]. Variations on these approaches, such as identifications of some types of problems as rendering a particular communication channel usable for only some purposes (e.g., a communication channel is not usable for streaming high definition full color video in real time, but is usable for transmission of reduced quality video or transmission of video after the fact rather than in real time) are also possible, and so the discussion of a command and control computer [119] splitting problems into those which do or do not render a communication channel unusable should be understood as being illustrative only, and should not be treated as limiting.

Continuing with the discussion of FIG. 3, after a problem has been detected [301][302], the command and control computer [119] could continue by taking steps to respond to the problem. For example, if the problem is one which is consistent with communications on the current channel being able to continue, a command and control computer [119] could determine how to bring the bandwidth needed for wireless communications within the limits imposed by the current communication channel, such as by using a global downgrade path to determine a set of instrumented helmets (i.e., an affinity group) whose communications should be downgraded [305] in order to lower the collective bandwidth of the wireless communications. To illustrate how this affinity group based approach could operate in practice, consider that, in general, viewers are not likely to be equally interested in video streams from all of the players on the field. To account for this, instrumented helmets can be grouped based on the expected interest in their video streams. Examples of these types of groupings are provided in table 2 below, though it should be understood that those groupings are presented for illustration only, and should not be treated as limiting on the ways this affinity group based approach could be implemented.

TABLE 2

Exemplary affinity groups.

| Type of Group | Example |
| --- | --- |
| Grouping based on position | The quarterback and wide receivers could be one group, offensive linemen could be another group, etc. |
| Grouping based on fan activity | Players could be grouped based on their utilization in major fantasy football leagues, pro bowl votes, etc. |
| Grouping based on player activity | Players could be grouped based on whether they are considered stars or franchise players, or whether they are particularly relevant to a rivalry, etc |
| Ad hoc groupings | Players could be grouped based on whether their feeds are likely to be particularly exciting, such as the runner and those in pursuit if there is a breakthrough on a rushing play, or if their feeds are likely to have particular emotional resonance, such as a player who is being removed from the game due to injury as he or she leaving the field, etc. |

With these types of affinity groups, a command and control computer [119] operating along the lines depicted in FIG. 3 could determine which affinity group could be required to downgrade its transmissions using a predefined global downgrade path. Such downgrade paths could, for example, take the form of rules, such as a rule stating that the affinity group that should be downgraded is the affinity group with the lowest priority level which is operating in a manner for which a downgrade is possible. Alternatively, downgrade paths could take the form of sequences, such as, in an embodiment with three affinity groups, downgrading group three, then downgrading group two, then downgrading group three, then downgrading group one, then downgrading group two again, etc. Variations on these downgrade paths and ways of expressing them (e.g., via a state machine which would downgrade each group once before any group was downgraded twice) are also possible, and so the examples given above should be understood as being illustrative only, and should not be treated as limiting.

Once the affinity group to downgrade had been determined [305], the remediation steps of FIG. 3 would continue by actually downgrading that affinity group based on an affinity group downgrade path [306]. Such a downgrade path could operate in a similar manner to the global downgrade path discussed above. However, rather than indicating an affinity group to downgrade, an affinity group downgrade path could indicate how an affinity group's handling of data should be changed when it is determined that that affinity group should be downgraded. To implement this, a command and control computer [119] could be configured with sets of parameters defining how the instrumented helmets should handle their data, along with downgrade paths (which could potentially be different for each affinity group) indicating how the affinity groups should progress through those sets of parameters as they are downgraded. Then, when a determination is made that a particular affinity group should be downgraded, the command and control computer [119] could send the instrumented helmets in that affinity group commands which would cause them to handle their data in the manner specified by the appropriate parameter set.

To illustrate how this type of downgrading through parameter sets could work, consider a case in which a command and control computer [119] is configured with three parameter sets for streaming video, and the instrumented helmets are organized into two affinity groups. These parameter sets could be, for example, a high quality streaming parameter set, in which video would be streamed at 1920×1080 resolution at a frame rate of 30 frames per second, a medium quality streaming parameter set, in which video would be streamed at 640×480 resolution at a frame rate of 42 frames per second, and a low quality streaming parameter set, in which video would be streamed at 640×480 resolution at a frame rate of 30 frames per second. Given these parameter sets, the command and control computer [119] could have a downgrade path for the higher priority affinity group of [high quality streaming parameter set→medium quality streaming parameter set→low quality streaming parameter set], and a downgrade path for the lower priority affinity group of [high quality streaming parameter set→low quality streaming parameter set]. Then, if the lower priority affinity group is currently operating using the high quality streaming parameter set and a determination is made that that affinity group should be downgraded, the command and control computer [119] could look up the downgrade path to determine that the low quality streaming parameter set should be used, then look up the parameters included in that parameter set to determine the commands to send to the helmets in the lower priority affinity group to implement the downgrade.

Of course, it should be understood that the above discussion of shifting through parameter sets using affinity group downgrade paths is intended to be illustrative only, and that the disclosed technology could be implemented in manners that vary from that discussed above. For example, rather than simply defining parameter sets in terms of resolution and frame rate, other types of parameters could be modified to change how instrumented helmets would manage their data. Illustrative examples of parameters other than frame rate and resolution, one or more of which could be used instead of or in addition to frame rate and resolution to define the treatment of data by the instrumented helmets, are set forth below in table 3.

TABLE 3

Exemplary parameters for handling data.

| Parameter | Explanation |
| --- | --- |
| Transmission mode | This parameter could indicate when data should be transmitted from the instrumented helmets. Examples of values that some implementations of the disclosed technology could be configured to support for this parameter include continuous transmission (e.g., |

TABLE 3-continued

Exemplary parameters for handling data.

| Parameter | Explanation |
| --- | --- |
| | streaming of real time video), demand based transmission (e.g., transmit a particular portion of the video stored on a helmet based on a signal from the command and control computer, such as transmitting stored video of a play based on a signal from the command and control computer triggered by the play clock indicating that that play is over), intermittent transmission (e.g., transmitting stored video on a periodic basis, or when storing additional video on an instrumented helmet would require overwriting video which had previously been captured). |
| Bit depth | This parameter could indicate how much data should be used to represent the color of each pixel. Examples of values that some implementations of the disclosed technology could be configured to support for this parameter include 8 bit color (e.g., 8 bits for each of the red, blue and green color channels), and 24 bit color (e.g., 24 bits for each of the red, blue and green color channels). |
| Color quant | This parameter could indicate how much a pixel has to change before that change will be reflected in the transmitted data. An example of a value that some implementations of the disclosed technology could be configured to support for this parameter is two bit quantization, in which a change with a magnitude that would require only one bit to represent (e.g., a change on an 8 bit red color channel from output level 0 to output level 1) would be ignored, but a change with a magnitude that would require multiple bits to represent would be reflected in the transmitted data. |
| Variable bit rate set | This parameter could indicate whether optimization functions provided by the software used to encode data for transmission (e.g., an H264 encoder) should be used to minimize bandwidth use which may be unnecessary so that more bandwidth can be freed up for more bandwidth intensive portions of the video stream. Values that some implementations of the disclosed technology could be configured to support for this parameter include the Boolean values TRUE and FALSE. |

Variations on parameters and approaches to representing downgrade paths are not the only types of variations which could be used to implement an affinity group based remediation approach. For example, in some implementations, it is possible that instrumented helmets might be assigned to multiple affinity groups, and that those affinity groups might change dynamically during system operation. To illustrate, consider a case where instrumented helmets are organized into affinity groups based on player position. In such an instance, to avoid a player with a relatively high degree of fan interest being given a relatively low priority based on his or her position, it is possible that a command and control computer [119] could support players being assigned to additional affinity groups based on fan interest, then, when determining which instrumented helmets to downgrade, could treat instrumented helmets in multiple affinity groups as having the priority of their highest priority affinity group. Similarly, if a player is involved in a particularly exciting play, then that player's instrumented helmet could be added to an ad hoc affinity group (which might only include that player's instrumented helmet) with a maximum priority, thereby allowing that player's data to be transmitted with maximum fidelity even as other instrumented helmets which share a position based affinity group with that player's helmet might be downgraded. Other variations on these types of approaches (e.g., changing priorities of affinity groups and/or resetting affinity groups or priority groups after each play to avoid creep) are also possible, and so the discussion above of how helmets could be downgraded based on their affinity groups should be understood as being illustrative only, and should not be seen as limiting.

Continuing with the discussion of FIG. 3, after an affinity group has been downgraded based on its downgrade path [306], a command and control computer [119] following the flowchart shown in that figure will check [307] if the downgrade has successfully remediated the problem. For example, if the command and control computer [119] detected a problem using its internal processing [301] by calculating that a command would result in the bandwidth needed to transmit data from the instrumented helmets exceeding a collective bandwidth limit, the check [307] could be to repeat the relevant calculations to determine if the collective bandwidth would still be exceeded after the appropriate affinity group had been downgraded. Once the check [307] had been made, if it indicated that the remediation had been successful, then the command and control computer [119] could treat remediation of the problem as being done [308]. Alternatively, if the check indicated that issues remained, then the command and control computer [119] could take appropriate additional remedial actions (e.g., taking different actions based on if the current communication channel appeared to still be usable, such as because there was a bandwidth over-allocation which could be addressed by further downgrades, versus needing to switch to another channel, such as based on detection of interference severe enough to render the current channel unusable).

Of course, an affinity group based downgrading approach such as described above is not the only type of remedial action that a command and control computer [119] could perform in response to detecting a problem [301][302]. For example, in the situation where a communication channel is rendered unusable, a command and control computer [119] could instruct [309] the instrumented helmets [101-107] and the access points [109-114] to stop using the current channel and to communicate with each other via a failover channel instead. At this point, the command and control computer [119] would preferably also determine a new failover channel [310] (e.g., using a channel switch path similar to the downgrade paths discussed previously). In this way, if either the initial channel switch is unsuccessful (e.g., because the problem which caused the channel switch also impacted the failover channel the command and control computer [119] instructed [309] the wireless devices to use) or if another problem requiring a channel switch subsequently arises, the system will be able to seamlessly perform that switch using the newly determined [310] failover channel.

Implementations which address problems in ways which depart from FIG. 3 are also possible. For example, where wireless communications take place in the 2.4 or 3.65 GHz bands, and multiple channels within those bands are combined to maximize bandwidth, it might make sense to program a command and control computer to always respond to errors by downgrading communications from one or more instrumented helmets, based on the assumption that a switch between channels will never be necessary. Alternatively, where wireless communications take place in the 5 GHz band, it might make sense to program a command and control computer [119] to always respond to an error in wireless communications by switching communication channels, based on the assumption that errors on the 5 GHz band are much more likely to have been caused by something like preemption by a radar system than something like transient interference or over allocation of bandwidth. Accordingly, the above discussion explaining how an embodiment could be implemented with multiple ways to account for detected communication problems should be understood as being illustrative only, and should not be treated as limiting.

Just as a command and control computer [119] configured to account for problems using the steps of FIG. 3 could be configured with multiple approaches to problem remediation, there are also multiple ways that such a computer could be configured to perform those steps. For example, in some implementations, the steps of FIG. 3 could be performed in a single function, with the specific steps to be performed controlled using IF . . . THEN statements or other types of conditionals. Alternatively, in some implementations, the steps of FIG. 3 could be split into different processes (or different threads of a single process), or some of the steps could be performed in one process (e.g., a single process which analyzed access point log files) while other steps could be separated from each other (e.g., there could be separate affinity group downgrading and channel switching functions which would be invoked as appropriate when a problem is detected).

Similarly, the nature of communications between devices and of problems which could be addressed could also differ from what was described above in the context of FIG. 3. For example, while the discussion of downgrading [306] an affinity group described how a command and control computer [119] could send instrumented helmets commands with the parameters determined by reference to an appropriate parameter set, it is also possible that instrumented helmets could be configured with the parameter sets they might be required to use, and a command and control computer [119] would simply send a command to operate according to a particular parameter set rather than specifying particular parameters to be used. Similarly, while the above discussion described how a command and control computer [119] could be configured to determine how to downgrade a particular affinity group using that group's downgrade path, it is possible that in some implementations a command and control computer [119] could be configured to send a downgrade command to the helmets in the appropriate affinity group, and rely on the helmets in that group determine what that downgrade would entail (e.g., by reference to downgrade paths which had previously been provided to those helmets).

As another variation, while the above discussion described comparing bandwidth required by all instrumented helmets with a global bandwidth limit, in some implementations a command and control computer [119] could be configured to identify wireless communication issues on the level of individual access points. For example, if particular instrumented helmets are configured to communicate with particular access points, a command and control computer could be configured to make sure the access points had sufficient capacity to handle the communications with their designated helmets. Then, if the command and control computer determined that an access point was in danger of being swamped, it could address the problem by reshuffling the allocation of wireless communications (e.g., by sending commands to one or more instrumented helmets instructing them to send their data to access points with different MAC addresses than those they had used previously) in a manner similar to that described for addressing over-allocation of the communication servers.

Of course, it should be understood devices in an environment such as shown in FIG. 1 be configured to provide functions either in addition to or as alternatives to the functions described above. For example, another type of functionality which a command and control computer [119] could provide to help a system implemented using the disclosed technology achieve the objectives of the particular context for which it is implemented is to upgrade the manner in which instrumented helmets could handle their video data. This could be implemented in a manner which is essentially the reverse of what was described above in the context of downgrading. That is, if a command and control computer [119] determines that there are additional resources available (e.g., if a source of transient interference disappears, thereby enabling more information to be transferred over a wireless communication channel), it could determine affinity groups to upgrade based on either a separate global upgrade path or by reversing the global downgrade path, and then upgrade those affinity groups by either reversing the downgrade paths for those groups or by applying a separate path which had been specified for upgrades.

Additionally, while the above discussion focused on capabilities a command and control computer [119] could have to address (or recover from) problems, it is possible that capabilities such as described above could also be used outside of the problem detection and/or recovery contexts. For example, rather than (or in addition to) taking place after a wireless communication problem is detected, the determination of a new failover channel could be performed on an ongoing basis during operation of the system—e.g., by continuously monitoring communications on the then designated failover channel(s) and determining new failover channels as necessary even if the channel then being used for wireless communications remains available. Similarly, rather than simply being used for responding to dynamic changes to capacity (e.g., as could be caused by transient interference), functionalities such as described above for a command and control computer [119] could also be used in other contexts. For example, the upgrading and downgrading of instrumented helmets as described above could be used during system setup to properly calibrate the equipment (e.g., all instrumented helmets could initially be set at their lowest/highest level, then upgraded/downgraded until no further upgrades/downgrades could be made/were necessary to operate within the constraints of the available resources).

A command and control computer [119] could also potentially be configured to optimize various aspects of the upgrading and downgrading of the instrumented helmets based on the context in which they would be used. To illustrate, consider the case where the instrumented helmets would be operating in low light conditions (e.g., night games). In this type of scenario, a command and control computer [119] could use the shutter speed required by the instrumented helmets to capture image to set a ceiling on the frame rates that it would instruct those helmets to use in handling their data. Thus, if a downgrade path indicated that an instrumented helmet should transmit video at 60 fps, but the shutter speed needed to capture images was set at $\frac{1}{50}^{th}$ of a second, then the command and control computer [119] could instruct the cameras to transmit video at a rate of 50 fps or lower (e.g., 48 fps), despite the higher frame rate which would have been specified by following the downgrade path.

As yet another type of variation on the functionality which could be provided by a command and control computer [119], it is possible that, in some implementations, a command and control computer [119] could allow a user to specify some aspects of how the system should operate. For example, rather than relying solely on use of global or affinity group specific downgrade paths, some embodiments could allow a user of a command and control computer [119] to simply specify the parameters for handling data, either based on his or her own estimation of what is appropriate, or based on information provided to him or her regarding the performance of the system (e.g., percentage of dropped packets, etc).

Combined approaches are also possible. For example, a command and control computer [119] could allow a human to set some parameters, and could then operate to optimize the remaining parameters within the constraints set by the human's choices. To illustrate, consider the case where a human (e.g., a replay producer) decides that video of the preceding play captured by a helmet whose video would normally be stored for subsequent use (e.g., during training) should be made available for streaming to fans (e.g., in the form of an instant replay). To support this type of decision making, a command and control computer [119] which might normally operate on its own to determine how video is handled could present an interface which would allow the user to send an atomic start/stop command to the relevant helmet, which command would cause the helmet to transmit data from its memory starting with a set time (e.g., when the play clock for the most recent play began) and ending with the receipt of the start/stop command. Similarly, if a human decided during a play that video which would normally be cached on a helmet should be streamed (e.g., because the player wearing that helmet was doing something particularly exciting), he or she could send a command to change the transmission mode for that helmet, and the command and control computer [119] could then try to optimize the way the remaining helmets handled their data in order to accommodate the human's decision within the constraints imposed by the system's available resources. The disclosed technology could also be implemented in systems which could allow other types of commands to be sent to the instrumented helmets. For example, instrumented helmets could be sent commands to cause them to reboot, update their software/firmware, take and transmit a static picture, and/or chirp back diagnostic information (e.g., battery life, signal strength, storage space, CPU temperature, etc). Accordingly, the above discussion of control of instrumented helmets via a command and control computer should be understood as being illustrative only, and should not be treated as limiting.

Of course, a command and control computer [119] could allow user involvement in other aspects of the system in addition to, or instead of, how data is treated by the instrumented helmets. For example, in some implementations, a command and control computer [119] could allow video processing, such as the smoothing described previously, to be customized by an operator. To illustrate, consider the case where smoothing is performed by taking a raw video stream, calculating pixel offsets based on gyroscopic data provided from the instrumented helmets, then using those pixel offsets to translate and crop the raw video to obtain a processed video stream. In this type of context, a command and control computer [119] could be configured to present an interface such as shown in FIG. 5 to allow a user to control the extent to which those offsets are applied to a particular video stream.

Figure 5:
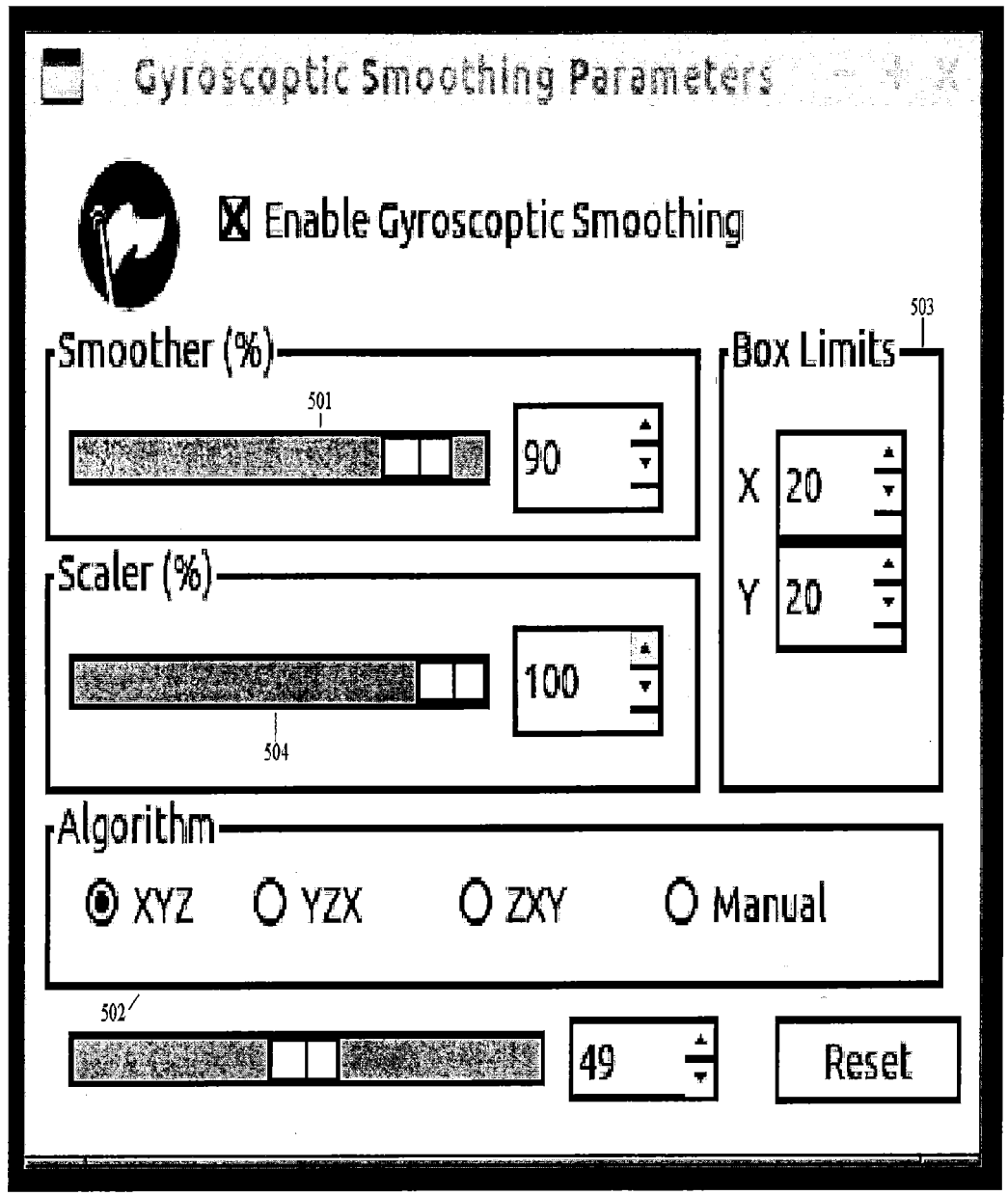
FIG. 5 depicts an exemplary interface which could be used to determine the extent to which smoothing offsets should be applied to a video stream.

In the interface of FIG. 5, the user is presented with a smoothing slider control [501] which can be used to moderate the impact of smoothing software on a video stream. For example, if the user sets a smoothing slider control [501] in an interface such as shown in FIG. 5 at 50% and the X-offset for a particular frame was +20 pixels, then instead of moving that frame 20 pixels, the frame could only be moved 10 pixels in the smoothed video stream. An interface such as shown in FIG. 5 could also allow a user to control other aspects of how a video stream is processed. For example, an algorithm orientation control [502] could be used to specify how an XYZ axis used to specify angular velocity should be mapped to the XYZ axis of an incoming video stream (e.g., XYZ=XYZ, XYZ=YZX, XYZ=gyroscope axis modified by some manually specified rotation). Similarly, a limit control tool [503] can allow the user to specify how much of each frame of raw video data could potentially be cut off to create the viewable video stream, and therefore how much smoothing could potentially take place (e.g., if the raw video data had a resolution of 100×100 pixels, then the user could specify that 20 pixels should be cut off in both the X and Y directions, resulting in a 80×80 final image which could potentially have been translated by 20 pixels for smoothing). The user could also be provided with a scaler slider control [504] which could allow him or her to specify that a raw video stream should be zoomed in as part of its processing (e.g., if 25% of a raw video stream is taken up by the sidelines, a scaler slider control could be used to specify that only 75% of the image should be shown so that only the (presumably) more interesting portion would be included in the final stream).

It should be noted that, while FIG. 5 illustrates only single instances of its various tools (e.g., only a single scaler slider control [504]), preferably if a user is allowed to modify the processing of video streams, he or she will be allowed to modify the processing of each stream individually, rather than only being able to make global changes that would be applied to all streams. In this way, a command a control computer can [119] allow the user to specify that some level of smoothing should be performed on the enhanced video streams, while still recognizing that completely eliminating the perceptible effects of camera movement could result in a boring video stream in which it is difficult to determine what is going on, and that different levels of processing might be optimal for different video streams (e.g., because different playing styles of different players might result in video streams which are more or less jerky).

It should be noted that, while the above example indicated that offsets could be obtained from existing software, the disclosed technology can be implemented in a manner that would still allow for customization of the kind described above without requiring smoothing software that provides offsets as output. This could be done, for example, by, instead of moderating the effect of smoothing software by changing offsets that the software produces, moderating the effect of the smoothing software by changing the gyroscopic data that is provided to the software as input. For instance, frame to frame changes in angular velocity could be smoothed by providing the smoothing algorithm a rolling average of a angular velocity data over a user specified period (e.g., over the preceding 500 milliseconds). Similarly, a formula could be applied to angular velocity data which would use a user specified value to determine relative contributions of current and preceding measurements. An example of this type of formula is provided below in equation 1:

$$\omega_{out} = \text{Avg}(\omega_{n-1} \ldots \omega_{n-m})*R + \omega_n*(1-R) \quad \text{Equation 1}$$

In that equation, $\omega_{out}$ is the angular velocity value which would be provided to the smoothing function. R is a (preferably user-specified) percentage contribution of previous angular velocity measurements. $\omega_n$ is the angular velocity corresponding to the current frame. $\omega_{n-1}$ is the angular velocity corresponding to the most recent preceding frame, and $\omega_{n-m}$ is the angular velocity corresponding to the last frame considered for the smoothing (e.g., if the smoothing was performed using the most recent 500 ms of data, and the frame rate was 60 fps, then $\omega_{n-m}$ would be the angular velocity corresponding to the 30$^{th}$ most recent frame). Approaches to mitigating the impact of smoothing software which modify data provided to that software as input but do not combine current and past data are also possible. For example, angular velocity data could be mapped to a logarithmic scale, so that extreme velocity measurements wouldn't result in more subtle changes being swamped.

It is also possible, that, rather than modifying angular velocity data provided to smoothing software as input, that software could be used to determine equations for calculating offsets, then offsets provided by those equations could be treated as if they had been provided by the smoothing software itself for the purpose of processing a video stream. For example, in a case where smoothing software is used which does not make offsets available, equations for determining offsets based on gyroscopic data in the enhanced video stream can be obtained by comparing the center positions (for X and Y offsets) and size (for the Z offset) of a prominent feature (e.g., a logo) in raw and smoothed video streams, then providing the gyroscopic data along with the information obtained via that comparison to a non-linear solver to obtain best fit equations for use in determining offsets using gyroscopic data going forward (e.g., x_pixel_offset=$-1.691497746 \cdot 10^{-2}(e^{-1.176028582 \cdot 10^{-2}\ gyroX} - e^{-1.691497746 \cdot 10^{-2}\ gyroX})/(-1.691497746 \cdot 10^{-2} + 1.176028582 \cdot 10^{-2}))$. Accordingly, the discussion above of use of existing software for obtaining offsets should be understood as being illustrative only, and should not be treated as limiting.

Of course, it should be understood that this type of offset customization may not be present in all embodiments (e.g., video could be smoothed on the instrumented helmets, and that smoothed video could be passed through the system without further modification), and even in implementations where it is performed, it does not have to be performed by a command and control computer [119]. For example, in some embodiments, it is possible that unsmoothed video could be provided to apps used to display a football game via mobile devices, and those apps would allow the users of the mobile devices to apply their own customized smoothing to the game as it is displayed to them, just as the user of the command and control computer [119] was enabled to customize the smoothing in the example set forth above.

Figure 2:
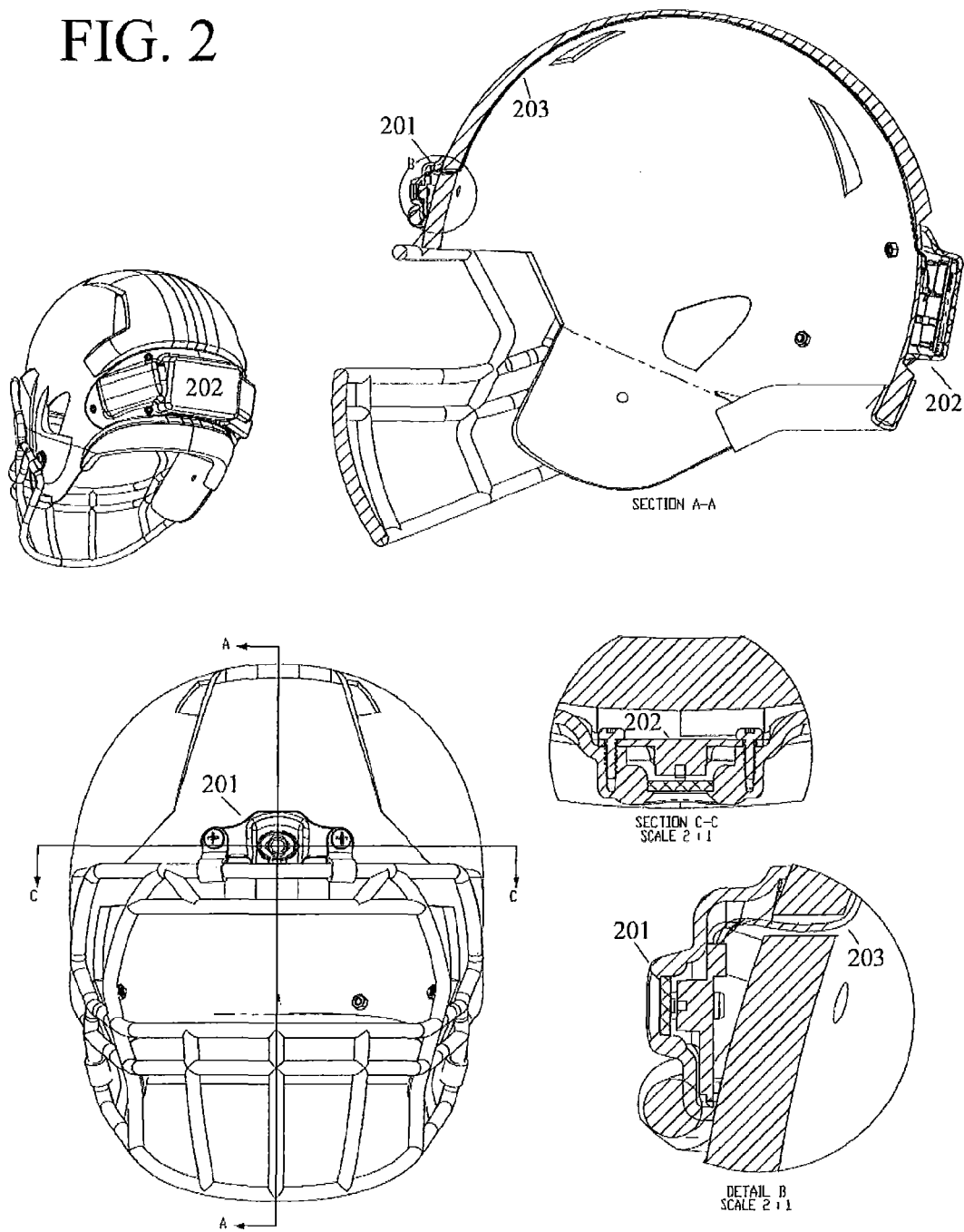
FIG. 2 depicts an exemplary embodiment of an instrumented helmet which could be used in the environment of FIG. 1.
Figure 4:
FIG. 4 depicts an exemplary embodiment of an instrumented helmet which could be used in the environment of FIG. 1.

Variations on hardware are possible beyond simply using devices not shown in FIG. 1 to enable customized smoothing. For example, rather than using an instrumented helmet such as shown in FIG. 2, it is possible that, such as by using a design of the type shown in FIG. 4, all components needed to capture and transmit video from the helmet could be housed within a single casing [401] which is snap-fit, friction-fit and/or adhered to a helmet such that no holes are needed to be drilled into the helmet itself. Similarly, rather than simply using a front facing camera, it is possible that video information could be captured using multiple cameras, a 360 degree camera, or a fisheye lens, which would have the beneficial effect of allowing a greater field of view to be represented in the video information (e.g., for the purpose of allowing viewers to know what is visible in a player's peripheral vision). As a further variation, different hardware could be used for capturing information for use in enhancing the video data, such as by replacing a gyroscope with an accelerometer, or by using a combination of gyroscopic and accelerometer measurements rather than relying on information from either of those types of devices alone.

Different types of transmitters could also be used. For example, it is possible that video information could be streamed using standard ISM frequencies such as 2.4 GHz or 5 GHz, or that more regulated frequencies such as 3.65 GHz could be used. Alternatively, frequencies such as 60 GHz could be used, which provides higher bandwidth at the cost of shorter range. It is also possible that additional components could be incorporated into the instrumented helmets to accommodate different types of transmissions. For example, in some implementations, instrumented helmets could include components which would normally work in the 5 GHz band but, due to the possibility of that band being preempted for use by radar systems, could also include transverters to allow them to send and receive information on the 3.65 GHz band.

Changes to support different types of transmission technologies beyond modifications to instrumented helmets are also possible. For example, in a case where 60 GHz transmissions are used, a field could be instrumented with receivers placed in (or under) the grass to allow for reception of signals despite the relatively short range of 60 GHz transmissions. It is also possible that helmets might be connected using phased array antenna and mesh network technology such that if one helmet was unable to establish a connection with a remote server, it could tie into another helmet which would relay the information. Other variations, such as placing a receiver above the field of play (which could be useful in implementations where information is transmitted using some kind of line of sight technology to avoid communications being broken by obstructions between instrumented helmets and receivers on the side) are also possible and will be immediately apparent to those of ordinary skill in the art. Accordingly, the description of variations above should be understood as being illustrative only, and should not be treated as limiting.

It should be understood that, while this disclosure has focused on how information can be streamed in an environment such as shown in FIG. 1, that environment is itself intended to be only illustrative, and should not be treated as limiting. For example, in FIG. 1, only seven of the player's helmets are identified as being instrumented helmets, but it is possible that more of the helmets (e.g., all of them) or fewer of the helmets (e.g., only 1-2) might be instrumented in a particular implementation. Similarly, while FIG. 1 illustrates six different access points, it is possible that more (e.g., one access point for each instrumented helmet) or fewer (e.g., one access point for each team) access points might be used. Indeed, a test implementation of the disclosed technology was found to be entirely operational with two instrumented helmets (those of the quarterback and a receiver) and four instrumented caps (on the referees) transmitting video in the form of UDP packets at a rate of 20 MBps to three access points which each had a bandwidth of 300 MBps. Of course, other variations, both for testing and operational deployment, are also possible, and could be implemented by those of ordinary skill in the art in light of this disclosure.

In light of the potential for variations and modifications to the material described explicitly herein, the disclosure of this document should not be treated as implying limits on the protection provided by this document or any related document. Instead, the protection provided by a document which claims the benefit of or is otherwise related to this document should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

Explicit Definitions

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability). In the claims, the word "server" should be understood as being a synonym for "computer," and the use of different words should be understood as intended to improve the readability of the claims, and not to imply that a "sever" is not a computer. Similarly, the various adjectives preceding the words "server" and "computer" in the claims are intended to improve readability, and should not be treated as limitations.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, to "configure" a computer should be understood to refer to providing the computer with specific data (which may include instructions) and/or making physical changes in the computer (e.g., adding peripherals) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "first," "second" and other modifiers which precede nouns or noun phrases should be understood as being labels which are intended to improve the readability of the claims, and should not be treated as limitations. For example, references to a "first communication server" and a "second communication server" should not be understood as requiring that one of the recited servers precedes the other in time, priority, network location, or any other manner.

When used in the claims, "means for detecting and responding to current or incipient problems in wireless communications which could interfere with streaming of video data captured by cameras on instrumented helmets" should be understood as a means+function limitation as provided for in 35 U.S.C. §112(f), in which the function is "detecting and responding to current or incipient problems in wireless communications which could interfere with streaming of video data captured by cameras on instrumented helmets" and the corresponding structure is a computer configured to perform processes as illustrated in FIG. 3 and discussed in paragraphs 19-32 and 34-35.

When used in the claims, "means for detecting and responding to wireless communication problems by modifying parameters according to which the instrumented helmets communicate with the access points" should be understood as a means+function limitation as provided for in 35 U.S.C. §112(f), in which the function is "detecting and responding to wireless communication problems by modifying parameters according to which the instrumented helmets communicate with the access points" and the corresponding structure is a computer configured to perform processes as illustrated in steps 301, 303, 305 and 306 of FIG. 3 and discussed in paragraphs 19-27, 29-32, and 35.

When used in the claims, "means for seamlessly switching between communication channels in the 5470-5725 MHz range of the 5 GHz band upon detection of preemption by a radar system" should be understood as a means+function limitation as provided for in 35 U.S.C. §112(f), in which the function is "seamlessly switching between communication channels in the 5470-5725 MHz range of the 5 GHz band upon detection of preemption by a radar system" and the corresponding structure is a computer configured to perform processes as illustrated in steps 304, 309 and 310 of FIG. 3 and discussed in paragraphs 20, 28, 29, 30 and 34.

When used in the claims, a "set" should be understood to refer to a group of one or more things of similar nature, design or function. The words "superset" and "subset" should be understood as being synonyms of "set," and the use of different words should be understood as intended to improve the readability of the claims, and not imply differences in meaning.

What is claimed is:

1. A method for allowing a plurality of video streams transmitted wirelessly from a plurality of sources to be processed and made available for viewing within limitations associated with the wireless transmission or subsequent processing of video, the method comprising:
   a) concurrently, each portable video capture and transmission device from a plurality of portable video capture and transmission devices performing a plurality of steps comprising:
      i) capturing video data via a camera comprised by that portable video capture and transmission device; and
      ii) wirelessly streaming video data captured by the camera comprised by that portable video capture and transmission device to an access point from a set of wireless access points, wherein:
         A) the wireless streaming of video data is performed using parameters stored in a memory comprised by that portable video capture and transmission device;
         B) the wireless streaming of video data comprises encoding the wirelessly streamed video data in a transmission format;
   b) processing, via one or more devices located remotely from the plurality of portable video capture and transmission devices, video data received by access points from the set of wireless access points by performing steps comprising converting video data received by access points from the set of wireless access points in the transmission format into a plurality of viewable video streams; and
   c) via a command and control computer, while the portable video capture and transmission devices from the plurality of portable video capture and transmission devices are wirelessly streaming video data, performing a set of steps comprising generating commands to control processing and/or wireless streaming of video data by other devices used in performing the method; wherein
      i) the set of steps performed via the command and control computer comprises detecting a current or incipient problem in processing or wireless streaming of video data by other devices used in performing the method;
      ii) the commands to control processing and/or wireless streaming of video data by other devices used in performing the method comprise one or more commands for addressing the detected current or incipient problem;
      iii) when the step of detecting the current or incipient problem takes place, each of the portable video capture and transmission devices from the plurality of portable video capture and transmission devices is configured to wirelessly stream video data using a first wireless channel;
      iv) the step of detecting the current or incipient problem is performed by determining, based on log files generated by access points from the set of wireless access points, that the first wireless channel is unusable; and
      v) the one or more commands for addressing the detected current or incipient problem comprise one or more commands instructing the plurality of portable video capture and transmission devices to use a failover channel for subsequent wireless streaming of video data.

2. The method of claim 1, wherein:
at least one of the one or more commands for addressing the detected current or incipient problem is sent to a target portable video capture and transmission device.

3. The method of claim 2, wherein:
   a) the set of steps performed via the command and control computer comprises, prior to detecting the current or incipient problem, determining the failover channel for streaming video data; and
   b) the set of steps performed via the command and control computer comprises, after detecting the current or incipient problem, determining a new failover channel for streaming video data.

4. The method of claim 3, wherein:
a) each of the portable video capture and transmission devices from the plurality of video capture and transmission devices is adapted to transmit and receive data using the 5 GHz band;
b) the determination that the first wireless channel is unusable is based on identification of a signal in the log files of preemption by a radar system in the 5 GHz band; and
c) the first wireless channel, the failover channel, and the new failover channel are each channels in the 5 GHz band.

5. The method of claim 2, wherein:
a) when the step of detecting the current or incipient problem takes place, each of the portable video capture and transmission devices from the plurality of portable video capture and transmission devices has a first set of parameters stored in its memory as the parameters used in wirelessly streaming video data;
b) the step of detecting the current or incipient problem is performed by determining that an available wireless bandwidth amount is insufficient to accommodate a required bandwidth amount for wirelessly streaming video data; and
c) the at least one of the one or more commands for addressing the detected current or incipient problem instructs the target portable video capture and transmission device to stream video data using a second set of parameters, wherein streaming video data using the second set of parameters requires less bandwidth than streaming video data using the first set of parameters.

6. The method of claim 5, wherein:
a) the plurality of video capture and transmission devices is comprised by a superset of video capture and transmission devices; and
b) the set of steps performed via the command and control computer comprises, before sending the at least one of the one or more commands for addressing the detected current or incipient problem:
   i) using affinity data organizing the superset of portable video capture and transmission devices into affinity groups, identifying one or more portable video capture and transmission devices from the superset of portable video capture and transmission devices to which commands for addressing the detected current or incipient problem should be sent; and
   ii) determining how to reduce bandwidth required by the one or more portable video capture and transmission devices identified using the affinity data based on a downgrade path.

7. The method of claim 6, wherein:
a) the required bandwidth amount is an amount of bandwidth that would be required if one or more upgrading portable video capture and transmission devices were caused to stream video data using a third set of parameters and no other changes were made, wherein streaming video data using the third set of parameters requires more bandwidth than streaming video data using the first set of parameters;
b) the target portable video capture and transmission device is comprised by the plurality of video capture and transmission devices, each of the portable video capture and transmission devices from the plurality of portable video capture and transmission devices is comprised by a first affinity group, and the target portable video capture and transmission device is sent the at least one of the one or more commands for addressing the detected current or incipient problem based on the target portable video capture and transmission device being included in the first affinity group; and
c) the set of steps performed via the command and control computer comprises, contemporaneously with sending the at least one of the one or more commands for addressing the detected current or incipient problem, sending, to the one or more upgrading portable video capture and transmission devices, commands to stream video data using the third set of parameters.

8. The method of claim 7, wherein:
a) the superset of portable video capture and transmission devices comprises one or more caching portable video capture and transmission devices, wherein when the step of detecting the current or incipient problem takes place each of the one or more caching portable video capture and transmission devices is configured to store captured video data in a memory comprised by that portable video capture and transmission device without streaming that captured video data; and
b) the one or more upgrading portable video capture and transmission devices comprises at least one device from the one or more caching portable video capture and transmission devices.

9. The method of claim 5, wherein the determination that the available wireless bandwidth amount is insufficient to accommodate the required bandwidth amount for wirelessly streaming video data is performed based on log files generated by access points from the set of wireless access points which indicate that interference has effectively reduced the available bandwidth to a point which is insufficient to accommodate the required bandwidth amount for wirelessly streaming video data.

10. The method of claim 1, wherein:
a) the method is performed during a football game;
b) each portable video capture and transmission device from the plurality of video capture and transmission devices is comprised by an instrumented helmet worn by a player in the football game;
c) each instrumented helmet worn by a player in the football game is modified with a modification selected from a group consisting of:
   i) a camera comprised by the portable video capture and transmission device being mounted on a front portion of that instrumented helmet and a control module with a wireless transceiver comprised by the portable video capture and transmission device being mounted on a back portion of that instrumented helmet and connected to the camera via a wire which passes through a hole in the helmet; and
   ii) a single housing including both the camera and the wireless transceiver comprised by the portable video capture and transmission device is mounted on the instrumented helmet without adding any holes to that instrumented helmet.

11. The method of claim 1, wherein:
a) each portable video capture and transmission device from the plurality of video capture and transmission devices is configured to wirelessly stream video data along with information indicating, for each frame of the streamed video data, angular velocity of that portable video capture and transmission device when that frame of streamed video data was captured;
b) converting video data received by access points from the set of wireless access points into a plurality of viewable video streams comprises, for each stream of video data from portable video capture and transmission devices from the plurality of portable video capture and transmission devices, using a smoothing function which takes angular velocity data as input to crop and translate video frames to that stream of video data; and c) the commands to control processing and/or wireless streaming of video data by other devices used in performing the method comprise one or more commands for reducing impact of the smoothing function based on input received by the command and control computer from a user.

12. The method of claim 11, wherein the command and control computer is configured to present an interface to the user which is operable by the user to specify a different reduction in impact of the smoothing function for each portable video capture and transmission device from the plurality of video capture and transmission devices.

13. The method of claim 11, wherein the one or more devices located remotely from the plurality of portable video capture and transmission devices are configured to, based on receiving commands for reducing impact of the smoothing function, reduce the impact of the smoothing function by performing one or more sets of steps selected from the group consisting of:
a) a set of steps comprising reducing frame to frame differences in angular velocity data provided to the smoothing function as input; and
b) a set of steps comprising:
    i) reducing offsets provided from the smoothing function as output; and
    ii) after they have been reduced, applying the offsets to the video streams associated with the angular velocity information on which they were based.

14. A system for allowing a plurality of video streams transmitted wirelessly from a plurality of sources to be processed and made available for viewing within limitations associated with the wireless transmission or subsequent processing of video, the system comprising:
a) a plurality of portable video capture and transmission devices, wherein each portable video capture and transmission device is configured to:
    i) capture video data via a camera comprised by that portable video capture and transmission device; and
    ii) wirelessly stream video data captured by the camera comprised by that portable video capture and transmission device to an access point from a set of wireless access points, wherein:
        A) the wireless streaming of video data is performed using parameters stored in a memory comprised by that portable video capture and transmission device;
        B) the wireless streaming of video data comprises encoding the wirelessly streamed video data in a transmission format;
b) the set of wireless access points;
c) one or more devices located remotely from the plurality of portable video capture and transmission devices and configured to process video data received by access points from the set of wireless access points by performing steps comprising converting video data received by access points from the set of wireless access points in the transmission format into a plurality of viewable video streams; and
d) a command and control computer configured with instructions operable to, when executed and while the portable video capture and transmission devices from the plurality of portable video capture and transmission devices are wirelessly streaming video data, cause the command and control computer to perform a set of steps comprising generating commands to control processing and/or wireless streaming of video data by other devices comprised by the system;
wherein
i) the set of steps the command and control computer would be caused to perform based on execution of instructions with which it is configured comprises detecting the current or incipient problem in processing or wireless streaming of video data by other devices comprised by the system;
ii) the commands to control processing and/or wireless streaming of video data by other devices comprised by the system comprise the one or more commands for addressing the detected current or incipient problem;
iii) detecting the current or incipient problem comprises determining, based on log files generated by access points from the set of wireless access points, that a wireless channel then in use is unusable;
iv) the one or more commands for addressing the detected current or incipient problem comprise one or more commands instructing the plurality of portable video capture and transmission devices to use a failover channel for subsequent wireless streaming of video data.

15. The system of claim 14 wherein:
the set of steps the command and control computer would be caused to perform based on execution of instructions with which it is configured comprises routing at least one of the one or more commands for addressing the detected current or incipient problem to a target portable video capture and transmission device.

16. The system of claim 15, wherein:
a) the set of steps the command and control computer would be caused to perform based on execution of instructions with which it is configured comprises, prior to detecting the current or incipient problem, determining the failover channel for streaming video data; and
b) the set of steps the command and control computer would be caused to perform based on execution of instructions with which it is configured comprises, after detecting the current or incipient problem, determining a new failover channel for streaming video data.

17. The system of claim 15, wherein:
a) each of the portable video capture and transmission devices from the plurality of portable video capture and transmission devices has a first set of parameters stored in its memory as the parameters used in wirelessly streaming video data;
b) the step of detecting the current or incipient problem comprises determining that an available wireless bandwidth amount is insufficient to accommodate a required bandwidth amount for wirelessly streaming video data; and
c) the at least one of the one or more commands for addressing the detected current or incipient problem instructs the target portable video capture and transmission device to stream video data using a second set of parameters, wherein streaming video data using the second set of parameters requires less bandwidth than streaming video data using the first set of parameters.

18. The system of claim 17, wherein:
a) the plurality of video capture and transmission devices is comprised by a superset of video capture and transmission devices; and
b) the set of steps the command and control computer would be caused to perform based on execution of instructions with which it is configured comprises, before sending the at least one of the one or more commands for addressing the detected current or incipient problem:
  i) using affinity data organizing the superset of portable video capture and transmission devices into affinity groups, identifying one or more portable video capture and transmission devices from the superset of portable video capture and transmission devices to which commands for addressing the detected current or incipient problem should be sent; and
  ii) determining how to reduce bandwidth required by the one or more portable video capture and transmission devices identified using the affinity data based on a downgrade path.

19. The system of claim 18, wherein:
a) the required bandwidth amount is an amount of bandwidth that would be required if one or more upgrading portable video capture and transmission devices were caused to stream video data using a third set of parameters and no other changes were made, wherein streaming video data using the third set of parameters requires more bandwidth than streaming video data using the first set of parameters;
b) the target portable video capture and transmission device is comprised by the plurality of video capture and transmission devices, and each of the portable video capture and transmission devices from the plurality of portable video capture and transmission devices is comprised by a first affinity group; and
c) the set of steps the command and control computer would be caused to perform based on execution of instructions with which it is configured comprises, contemporaneously with sending the at least one of the one or more commands for addressing the detected current or incipient problem, sending, to the one or more upgrading portable video capture and transmission devices, commands to stream video data using the third set of parameters.

20. The system of claim 14, wherein:
a) each portable video capture and transmission device from the plurality of video capture and transmission devices is configured to wirelessly stream video data along with information indicating, for each frame of the streamed video data, angular velocity of that portable video capture and transmission device when that frame of streamed video data was captured;
b) converting video data received by access points from the set of wireless access points into a plurality of viewable video streams comprises, for each stream of video data from portable video capture and transmission devices from the plurality of portable video capture and transmission devices, using a smoothing function which takes angular velocity data as input to crop and translate video frames to that stream of video data; and
c) the commands to control processing and/or wireless streaming of video data by other devices used in performing the method comprise one or more commands for reducing impact of the smoothing function based on input received by the command and control computer from a user.

\* \* \* \* \*